United States Patent [19]

Buckingham

[11] Patent Number: 5,141,541
[45] Date of Patent: Aug. 25, 1992

[54] JACK TOP RECEIVER FOR A VACUUM WASTE REMOVAL SYSTEM

[75] Inventor: Paul J. Buckingham, Abington, Mass.

[73] Assignee: Abington, Inc., Abington, Mass.

[21] Appl. No.: 702,912

[22] Filed: May 20, 1991

[51] Int. Cl.⁵ .......................................... B01D 46/00
[52] U.S. Cl. ..................................... 55/478; 55/432; 55/502; 55/337
[58] Field of Search ................. 55/337, 432, 433, 480, 55/481, 467, 478, 502, 470–473, 493

[56] References Cited

U.S. PATENT DOCUMENTS

| | | | |
|---|---|---|---|
| 2,507,672 | 5/1950 | McAllister | 55/472 |
| 3,046,718 | 7/1962 | Ide et al. | 55/470 |
| 3,628,213 | 12/1971 | Ramo | 15/352 |
| 4,157,964 | 6/1979 | Rishel | 210/238 |
| 4,193,161 | 3/1980 | Scott | 15/352 |
| 4,671,873 | 6/1987 | Keller | 210/232 |
| 4,681,609 | 7/1987 | Howeth | 55/480 |
| 4,767,427 | 8/1988 | Barabas et al. | 55/493 |

FOREIGN PATENT DOCUMENTS 671601  5/1952  United Kingdom ............... 55/433

Primary Examiner—Bernard Nozick
Attorney, Agent, or Firm—Cort Flint

[57] ABSTRACT

A vacuum cleaning arrangement having a collecting tank in which a jack system is arranged about its periphery which is operative to lift and separate an upper portion of the tank from a lower portion of the tank and also to move the upper and lower portions into contact under pressure. A filter screen is positioned between the upper and lower portions. The filter screen comprises a screen formed of metal wires and a perforated metal plate. A U-shaped resilient seal or gasket is secured about the outer surface of the plate. The arrangement provides that when the upper portion is drawn into contact with the lower portion, the portions engage the gasket with sufficient pressure to form an air-tight seal therebetween.

18 Claims, 5 Drawing Sheets

JACK TOP RECEIVER FOR A VACUUM WASTE REMOVAL SYSTEM

BACKGROUND OF THE INVENTION

In vacuum cleaning removal systems, the use of a screen to separate the dome and the shell of the receiver tank is well known as illustrated in U.S. Pat. No. 3,628,213, and our co-pending application Ser. No. 685,467. The use of air jets to clean the screen between waste removal cycles is also well known.

There still remains the problem that at various intervals, the screens must be replaced because they become clogged with oils, lint, and other debris which accumulate over time or they become damaged. In either instance, lengthy and thus costly down time results because of the known mechanisms for separating the dome from the shell. These mechanisms usually consist of a plurality of bolts and lugs arranged about the periphery of the receiving tank which must be hand actuated to both separate the dome from the shell and to then re-seal them in an air-tight manner. The extreme weight of the receiving tank, between 600 and 700 pounds, is a major contributing factor to the problems encountered when replacing the screen. Also, that the receiving tanks operate in a suspended condition is a further contributing factor.

In vacuum cleaning removal systems of the type disclosed, the use of permanent seals arranged about the periphery of the screen has not previously been done. The use of seals about the edges of screens for use in various other type systems is well known as is illustrated by U.S. Pat. No. 4,157,964. Here, U-shaped seals 68, 80 of elastomeric material are connected to a ring 72 carrying liner 42 or disk 86 which acts with edge 84 and cover 27 to seal against leakage. Here, no seal operates with both the filter and top to bring about an air-tight engagement of the tank. Also, because of the different environments, the seals of U.S. Pat. No. 4,157,964 do not confront the same pressure requirements necessary for a vacuum cleaning operation.

U.S. Pat. Nos. 4,671,873 and 4,767,427 show seals for use with filter elements, but not for use with vacuum cleaning systems. The seals disclosed are not U-shaped.

It is an object of this invention to overcome the problems as indicated in the prior art arrangements.

It is another object of the invention to provide a system for the collecting tank of vacuum cleaning systems which can act to separate the dome and shell and which can also bring them back together.

It is another object of the invention to provide means for a receiving tank of vacuum cleaning system which is capable of maintaining the dome in a position separated from the tank.

Another object of the invention is to provide means which will lock the dome against the shell under pressure sufficient to create an air-tight seal.

Another object of the invention is to provide means which will allow the dome and shell of a vacuum cleaning system to be separated and at the same time allow space to remove and replace the filter screen of the invention.

Another object of the invention is to provide a filter screen for use with a vacuum cleaning system which is equipped with a sealing member about its edges.

Another object of the invention is to provide a screen for a receiving tank with a sealing gasket which cooperates with the edges of the tank to produce an air-tight seal.

SUMMARY OF THE INVENTION

A vacuum waste removal system having a circular waste receiving tank which includes a receiver shell to which an intake conduit is connected and a dome to which an outlet conduit is connected. A waste filtering screen is arranged between an upper end of the shell and a lower end of the dome. Securing means are arranged about the periphery of the tank which are operative to draw the dome and the shell against resilient edges of the screen with sufficient pressure to produce an air-tight seal therebetween. The securing means are further operative to separate the dome from contact with the screen and the shell.

The securing means include a plurality of jack levers which are arranged at equal intervals about the outer periphery of the dome. Each jack lever includes a piston arranged for vertical movement between a lifting position in which the dome and the shell are held in a separated condition, and a sealing position in which the dome and the shell are held in engagement. The securing means includes a plurality of jacking bolts attached with a lost motion arrangement to the upper end of the shell and to the piston for movement therewith. The result is when the pistons are moved to the lifting position, the jacking bolts engage an upper surface of the upper end of the shell and act to separate the dome from contact with the screen assembly and the upper end. When the piston is moved to the sealing position, the jacking bolts contact a lower surface of the upper end to draw the lower end of the dome into sealing contact with the screen assembly and the upper end of the tank.

The pistons are provided with a threaded cavity extending vertically from a lower surface thereof and the jacking bolts are united with the pistons by being threaded into the cavities. The dome is provided about its outer periphery with a plurality of equally spaced support lugs. Each support lug carries a jack lever for pivotal movement. The jack levers are connected with the pistons via a link assembly pivotally mounted to each of the jack levers at a point off-set from its pivotal axis. The link assemblies are also pivotally connected to an end of the pistons which are arranged in bearing means carried by the support lugs for vertical movement.

This arrangement provides that when the jack levers are moved to a first position, the pistons move away from the upper end of the tank carrying the jacking bolts into engagement with the lower surface which draws the dome and the shell toward each other. Also, when the jack levers are moved to a second position, the pistons are moved toward the upper end carrying the jacking bolts into engagement with the upper surface of the upper end which forces the dome and the shell away from each other.

The upper end of the tank comprises a shoulder to which an adaptor plate is attached. The adaptor plate is provided with a plurality of hanging lugs equally spaced about its periphery and in alignment with the support lugs. The hanging lugs are provided with a first and a second set of apertures equally spaced. The jacking bolts are each arranged to pass through the first set of apertures in the hanging lugs. A plurality of hanger rods, extending from a ceiling support, pass through the second set of apertures. The hanger rods have arranged on a lower end thereof means which engage the lower surface of the hanger lugs to maintain the vacuum cleaning tank in a suspended condition.

A filter screen is positioned between the upper and lower portion of the receiving tank. The filter screen consists of a metal outer ring to which is secured a screen formed of metal wires and a perforated metal plate. A U-shaped resilient seal is secured about the outer surface of the ring. The resilient seal provides an air-tight seal when the upper portion is drawn into proximity of the lower portion.

The screen comprises stainless steel wires which are woven in a square weave. The wires are sized between a number 20 and a number 200. The metal plate is 3/16" steel and the resilient seal is neoprene. The filter has a diameter between 24", 30", and 48".

A vacuum waste removal system in which a receiving tank is suspended from an overhead support by a plurality of hanger rods evenly arranged about its periphery. The tank comprises a dome and a shell. Jack means are secured to the tank in positions adjacent each of the hanger rods. A plurality of hanging plates extend radially from the exterior of the shell and connect with hanger rods to support the vacuum tank. A plurality of supporting lugs extend radially from the exterior of the dome. The jack means which are connected to the supporting lugs include linkage interconnecting the dome and the shell for positive movement between a separated position and an engaged position.

A screen assembly is removably located between the dome and the shell. When the jack means positions the dome and the shell in the engaged position, the periphery of the screen is engaged therebetween in an air-tight seal. When the jack means positions the dome and the shell in the separated position, the periphery of the screen is released and the screen may be removed from the tank.

Each of the hanger rods include an upper rod connected to the overhead support and a lower rod united with the lower rod via a coupling. The lower rod is provided with securing means which comprise enlarged head at one end which engages with the hanging plate. The coupling acts as means which adjustable interconnect adjacent ends of the upper and lower support rods.

There are four hanger rods and four jacking means arranged about the periphery at 90° intervals. The jacking means is capable of maintaining the shell and dome in spaced relationship with one of the jack means disconnected and removed from one of the hanging plates. By removing the adjacent hanger rod, a space is created which allows the screen to be removed and be replaced with a fresh, clean one.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
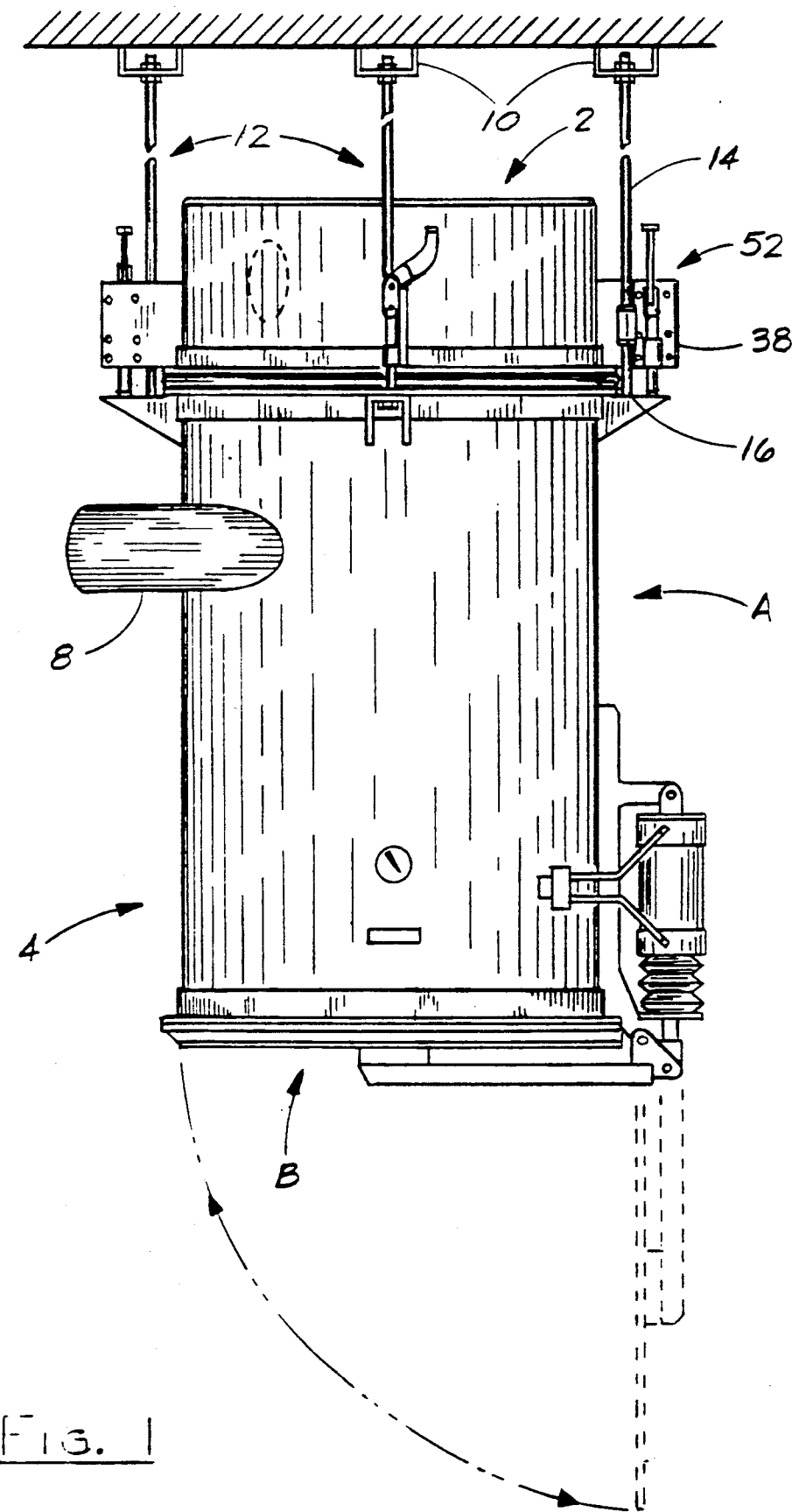
FIG. 1 is a side view of the receiving tank of the invention.
Figure 2:
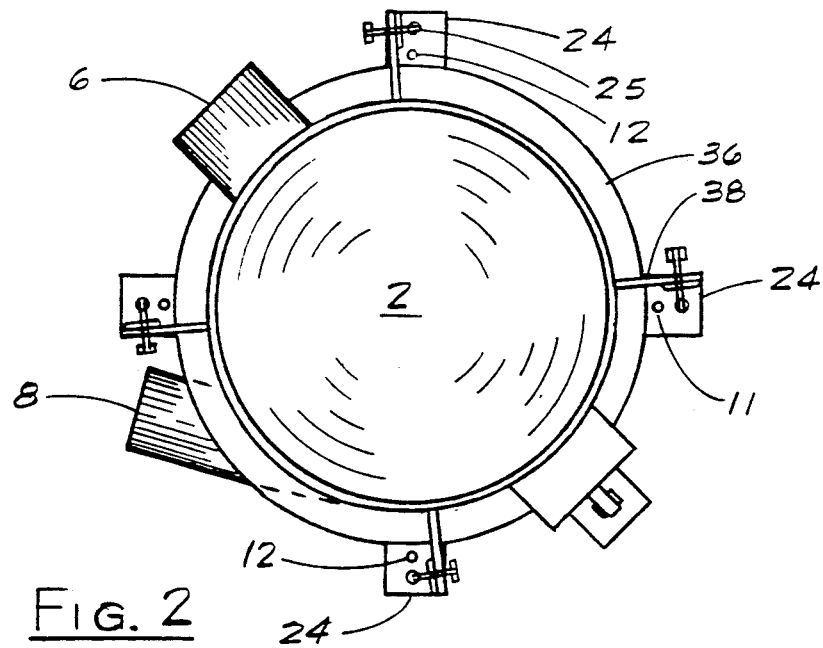
FIG. 2 is a top view of the receiving tank.

Referring now to FIGS. 1, 2, 3, and 6 there can be seen the receiving and collecting tank of a vacuum cleaning arrangement. Collecting tank A consists of an upper or dome portion 2 and a lower or shell portion 4. In a usual manner, dome 2 has a suction creating conduit connected to the side thereof at 6. A suction conduit which is connected with shell 4 at 8 acts to connect collecting tank A with various cleaning stations in the usual manner. As seen in FIGS. 1 and 2, receiving tank A is suspended from a ceiling support 10 via a plurality of hanging rods 12 arranged at equally spaced points about its periphery.

Each hanging rod 12 consists of an upper support rod 14 and a lower support rod 16. The upper support rod 14 is connected at its upper end to ceiling support 10 and has a threaded lower end. The lower support rod 16, which has an enlarged lower end 18, and a threaded upper end which is adjustably connected with upper support rod 14 by coupling 20. Enlarged lower end 18 engages with the lower surface 26 or 26' of a hanging plate 24 or 24' which extends outwardly from the periphery of shell 4.

Figure 3:
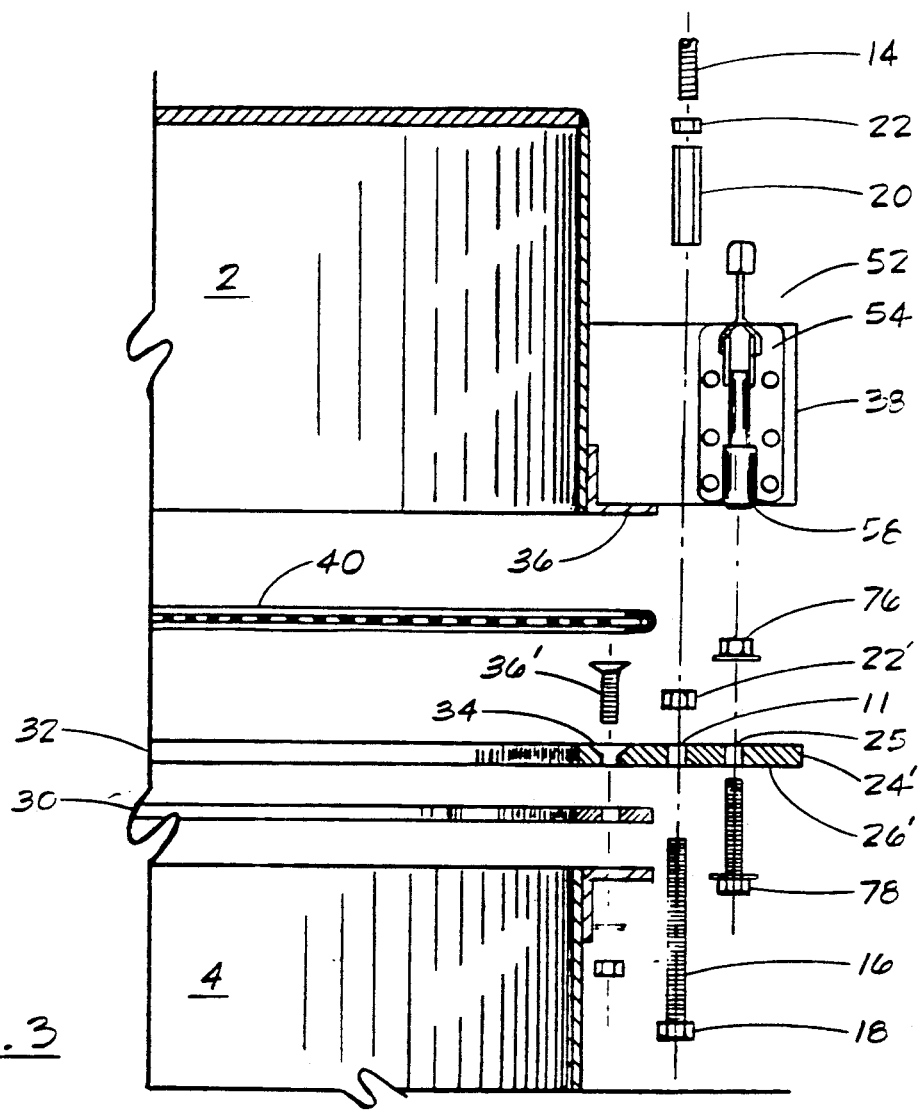
FIG. 3 is an exploded section side view of the upper portion of the receiving tank showing one form of hanging plate.
Figure 6:
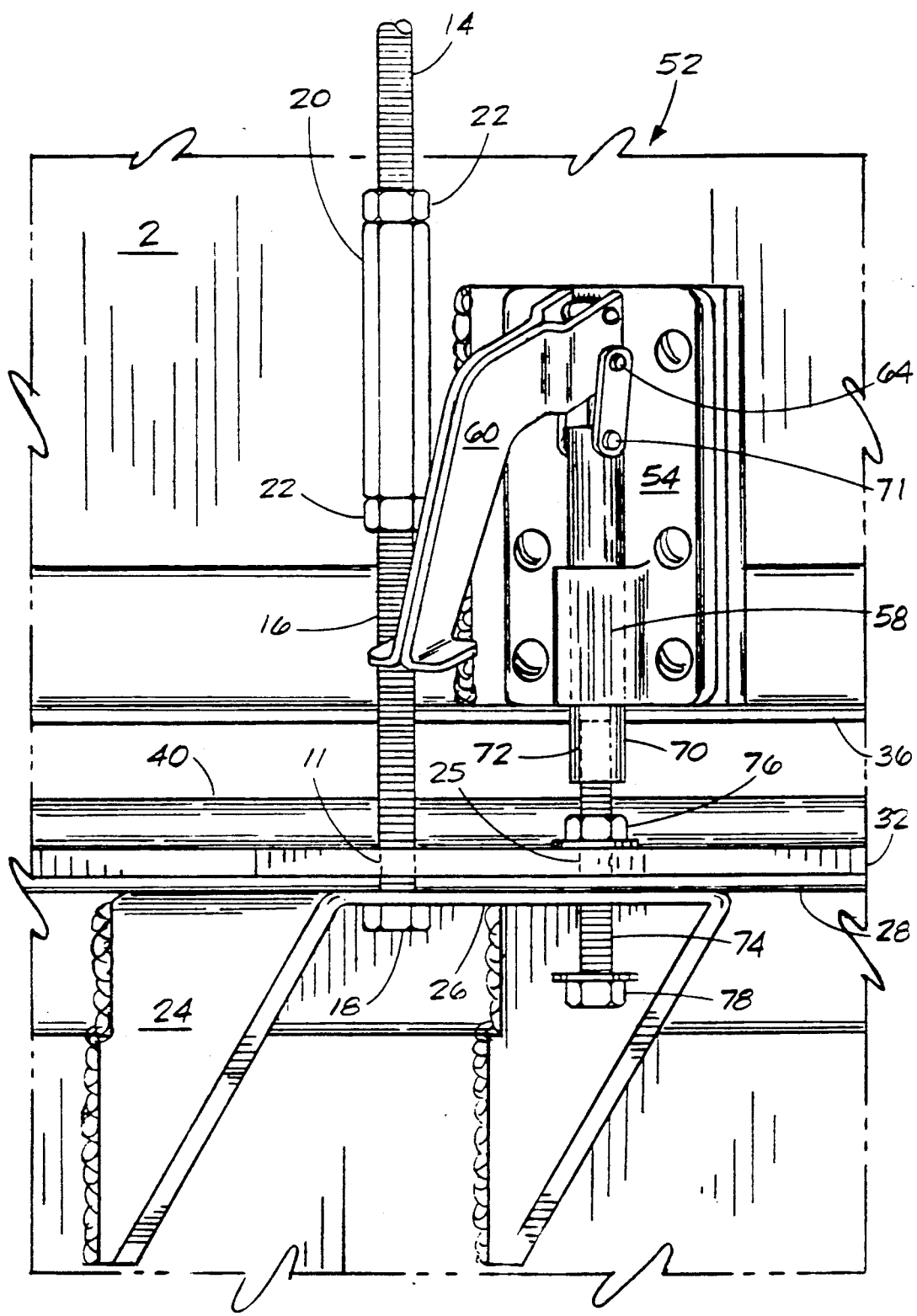
FIG. 6 is a detailed sectional side view showing the jacking assembly in locked open position and showing an alternative form of hanging plate.

Couplings 20 provide for vertical adjustment of the hanging rods. By selectively rotating coupling 20 the length of that rod is either shortened or lengthened. A pair of lock nuts 22 or 22', as shown in FIGS. 3 and 6, secure the arrangement in the selection position. In this manner, the collecting tank can be maintained vertically in a suspended position.

Hanging plates 24 are arranged equally spaced about the periphery of shell 4, as best seen in FIG. 2. Each plate includes a pair of openings 11 and 25 which are preferably circular and in radial alignment. Of course, openings 11 and 25 could have a configured inner surface and be radially spaced.

Shell 4 has a discharge door B arranged to operate in the usual manner at its lower end. The upper end of shell 4 consists of an outwardly turned flange 28 which is secured to the periphery of shell 4. The upper surface of flange 28 is adapted to receive a gasket 30 upon which is fitted an adapter plate 32. A plurality of aligned bores 34 are arranged about the circumference of flange 28, gasket 30, and adapter plate 32, with the upper portion of the bore in the adapter plate being counter sunk. Flat headed bolts 36' pass through bores 34 and unite adapter plate 32 with flange 28 in an airtight condition by means and gasket 30. A planar upper surface for adapter plate 3 is also provided because of the counterbore.

As clearly seen in FIG. 3 and 6, hanging plate 24, 24' may be either simply welded to the periphery of tank 4 or it may be an extension of adapter plate 32. For each arrangement, the plates are equally spaced about the periphery of receiving tank A, as shown in FIG. 2.

Dome 2 also has a flange member 36 secured about its periphery. A plurality of support lugs 38 are arranged about the outer periphery of dome 2 and also to the upper surface of flange 36. Lugs 38 are arranged coincident with flanges 24 of shell 4.

Figure 7:
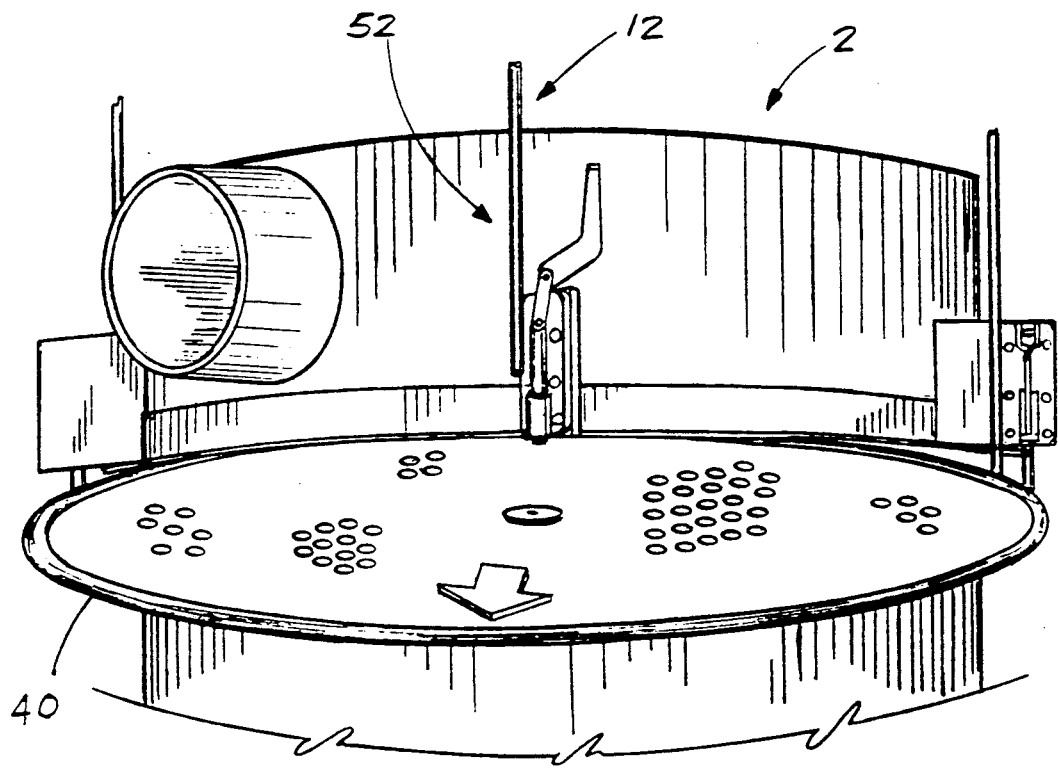
FIG. 7 is a sectional side view showing the receiving tank in separated condition and the screen partially removed.
Figure 8:
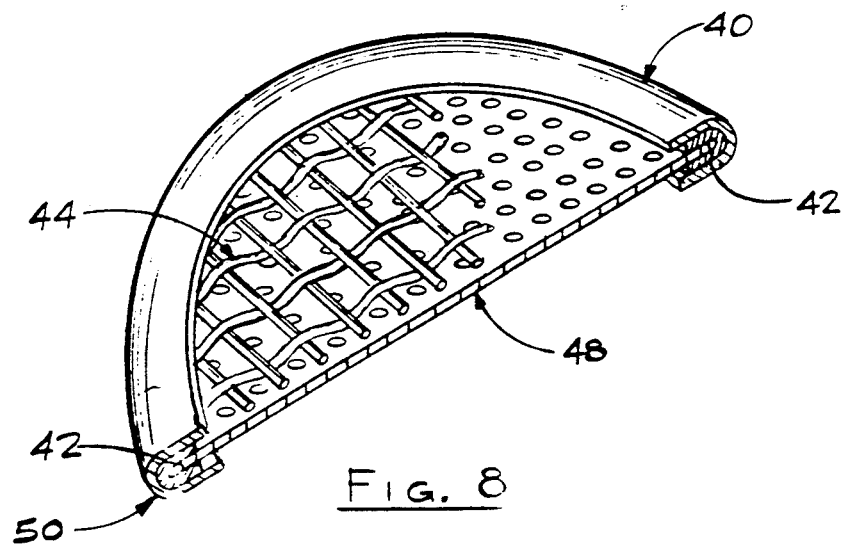
FIG. 8 is a sectional perspective view of the filter.

A filter screen, shown at 40 in FIGS. 2, 6, 7, and 8, is arranged to be placed over an upper end of shell 4. Filter screen 40 consists of a woven mesh 44 and a perforated steel plate 48. The outer edges of plate 48 are square cut as shown at 42 in FIG. 8. Woven mesh 44, preferably of stainless steel wire, is cut to conform with the periphery of plate 48. The screen is bonded about the entire upper surface of the perforated plate 48, as shown in FIG. 8.

The outer edge of filter screen assembly 40 is encased in a "U-shaped" elastic gasket or seal 50. Preferably, gasket or seal 50 is secured to filter screen assembly 40 by an adhesive and is formed of 40 dirometer neoprene.

There are many options which are satisfactory. Other elastic or rubber materials are suitable for forming gasket 50. It is not necessary that gasket 50 be bonded to the ring, as it could just easily be frictionally held in position. Plate 48 which is preferably 3/16 inch thick need not necessarily be square cut but could have rounded inner and outer surfaces or at least rounded edges for these surfaces. Finally, the mesh may be woven of wires ranging in size between number 20 and number 200 in a plane weave, a square weave, or any other weave which produces a satisfactory stable structure.

A jacking assembly 52 is secured to one side of each lug 38 adjacent to its outer end. Each jacking assembly 52 includes a mounting plate 54 having an ear 56 protruding from its upper end and a vertically arranged bearing 58 at its lower end. Plates 58 are secured to each supporting lug. Jack lever 60 which includes a handle is pivotally mounted to ear 58 at 62. Pin 64 is arranged on jack lever 60 between its pivotal connection 62 to ear 56 and its handle. Pin 64 extends through the jack lever to provide pivotal connection for links 68 which are arranged on each side of jack lever 60. The opposite ends of links 68 are connected to the upper end of piston 70 by pin 71. Piston 70 is maintained in position for vertical movement by bearing 58.

Figure 4:
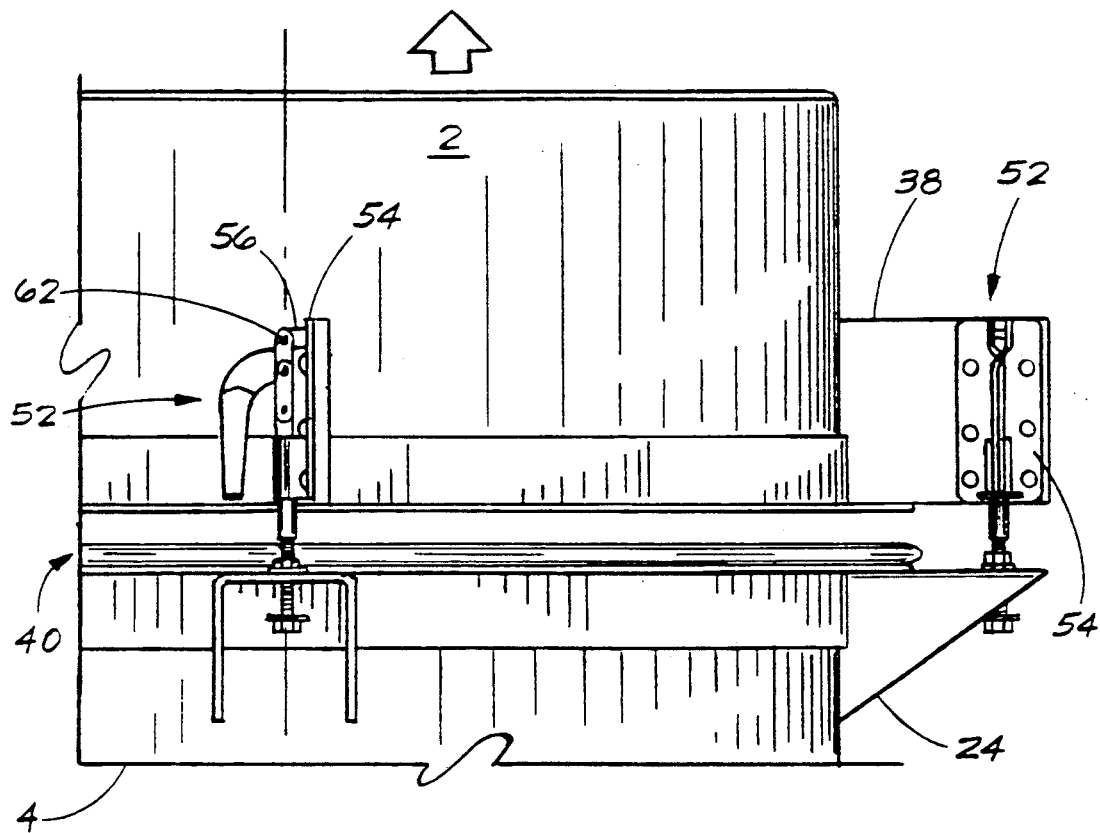
FIG. 4 is a side sectional view showing the jacking assembly in locked open position.
Figure 5:
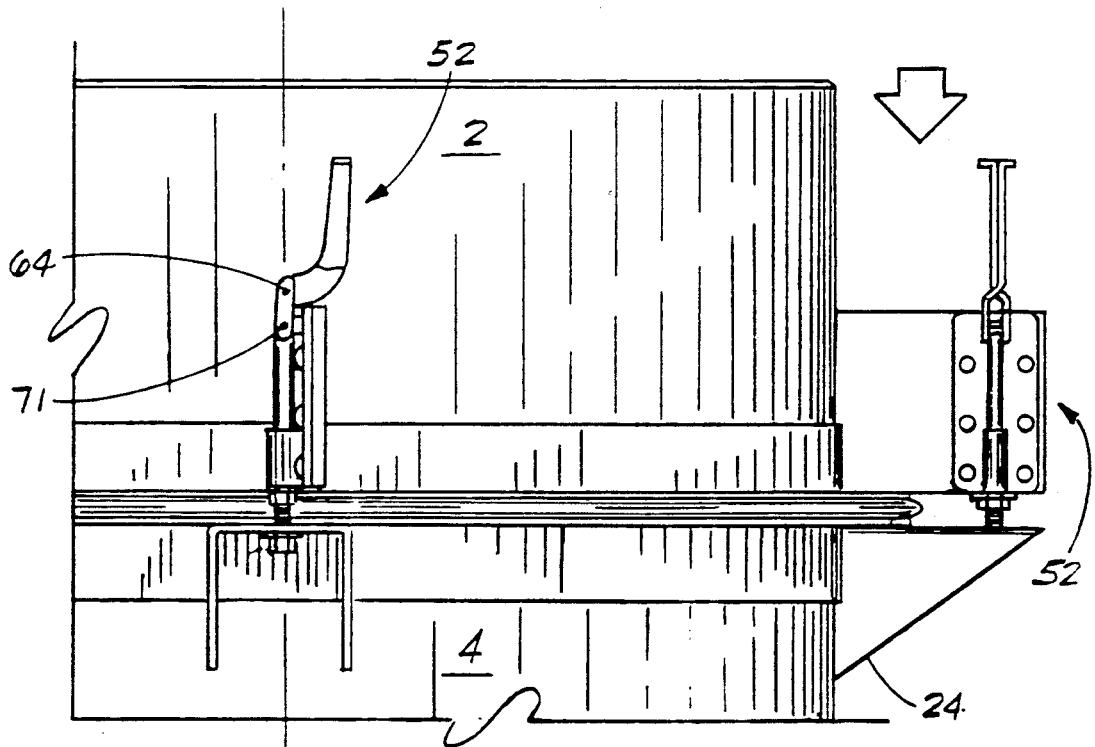
FIG. 5 is a side view, similar to FIG. 4, showing the jacking assembly in locked sealed position.

In operation, when jack lever 60 is moved to its raised position, pin 64, which moves with the jack lever, is moved from a position on one side of pivot 62 to a position above and across the pivot 62, as shown in FIGS. 5 and 7 where the jack lever is locked in position. When it is desired to move jack lever 60 to its lower position, pin 64 is moved across pivot 62, downwardly below and again across pivot 62 to the position shown in FIGS. 4 and 6. Again, jack lever 60 is locked in position.

The arrangement so far described provides for piston 70 to be moved vertically and locked in an elevated first position by movement of said jack lever 60 to its raised position and to be moved vertically downward and locked in its down position when the jack lever is moved to its lower position.

The lower end of each piston 70 has a threaded bore 72 extending along its axis. Jacking bolt 74, which extends freely through bore 25 of adapter plate 24 is threaded into bore 72 of piston 70. Jacking bolt 74 is provided with an upper locking nut 76 and lower locking nut 78. Each locking nut has a contact face directed toward a surface of hanging plate 24.

In practice, each jacking bolt 74 is secured to each piston 70. Lower locking nuts 76 and 78 are then located at a desired position above and below the hanging plate. The distance between the locking nuts creates a lost motion for the jacking assembly 52 as the jacking bolt must traverse that distance before either contact face of nuts 76 and 78 engages with the upper and lower surfaces of hanging plate 24. By adjusting locking nuts 76 and 78 along the jacking bolt, the degree of pressure applied to maintain dome 2 and shell 4 in contact with the filter screen is adjustable. Also, the distance by which dome 2 and shell 4 are separated may be regulated.

The arrangement thus far described operates in the following manner. When it is desired that dome 2 be brought into contact with shell 4, the jacking assembly 52 is moved to its engaging piston. This requires that the jack levers 60 be brought to their raised position as shown in FIG. 5. In this position, pin 64 brings the upper end of the links to a position above and across pivot 62. This movement brings pistons 70 to the raised position. As pistons 70 are pulled upwardly, jacking bolts 74 are drawn through bores 25 until the contact surface of nut 78 engages lower surface 26 of hanging plate 25. Further movement of piston 70 brings flanges 36 of dome 2 into contact with gasket 50 of filter screen 40. Finally, the jack lever is moved to its upper locked position, as shown in FIG. 5, which produces a final downward thrust of dome 2 against gasket 50 and the upper face of adapter plate 32 which produces an airtight connection between the dome, filter screen, and shell.

To separate the dome 2, filter screen 40 and shell 4, the jack levers are moved downwardly. This movement causes pin 64 to move to a position below pivot 62. This movement causes piston 70 to move downwardly carrying jacking bolt 74 with it. When upper locking nut 76 engages upper the face of adapter plate 24, further movement of piston 70 causes the jacking linkage to lift dome 2 upwardly and away from filter screen 40 and shell 4. Finally, jack lever 60 is moved into its lower locked position shown in FIGS. 4 an 6 in which dome 2 and shell 4 are firmly held in a separated position.

Filters 40 become clogged after extended use with lint knurls and other debris or they become damaged through use. At this time, it is necessary to exchange the clogged filter screen with a fresh one. This is accomplished by removing a portion of an adjacent hanging rod 12 and jacking mechanism 52, for example, at C as indicated in FIG. 2. This can only be done when all jacking mechanisms are firmly locked in the separating position, shown in FIGS. 4 and 6. The selected support rod 12 has its lower support rod 16 separated at its juncture with coupling 20. The lower rod 16 is removed from bore 11. Now, the adjacent jacking bolt 74 is removed from the end of piston 70 and bore 25. This provides for an unobstructed opening about substantially half of the peripheries of the separated dome and shell. The clogged filter screen is simply slid through this opening, as shown in FIG. 7, and removed. A replacement screen is then inserted through the opening and positioned about the upper surface of adapter plate 32. Removed lower support rod 16 is now reunited with upper support rod by coupling 20 in the manner previously described. Jacking bolt 74 is also reunited with piston 70 also in the manner above described. The jacking assemblies are now moved to draw dome 2 into contact with screen gasket 50 and against the shell 4. The jack levers 60 are moved to their upper locked position which moves the dome and shell toward each other and produces an air-tight seal between the dome, screen and shell. The receiving tank is now in operative condition. This arrangement provides for a fast and dependable manner for replacing the screen.

It is noted that in practice, the jack levers are all moved to the desired position when changing from one locked position to the other. If only a single operator is available, two opposed jack levers are simultaneously moved to the desired locked position. The other two jack levers are then simultaneously moved to the same position. If two operators are available, all four levers are simultaneously moved. This allows for balanced movement of the dome.

While a preferred embodiment of the invention has been described using specific terms, such description is for illustrative purposes only, and it is to be understood that changes and variations may be made without departing from the spirit or scope of the following claims.

What is claimed is:

1. A vacuum waste removal system having a circular waste receiving tank which includes a receiver shell to which an intake conduit is connected and a dome to which an outlet conduit is connected, a waste filtering screen is arranged between an upper end of said shell and a lower end of said dome, the improvement comprising:

a plurality of securing means each including a jack lever arranged about the periphery of said tank, said securing means being at least partially collectively operative to drawn and lock said dome and said shell against resilient edges of said screen with sufficient pressure to produce an air-tight seal therebetween and also being at least partially collectively operative to separate said dome from contact with said screen and said shell.

2. The system of claim 1 wherein said securing means, including said jack levers, are arranged at equal intervals about the outer periphery of said dome, each said jack lever includes a piston arranged for vertical movement between a lifting position in which said dome and said shell are separated, and a sealing position in which said dome and said shell are in engagement.

3. The system of claim 2 wherein there is provided a jacking bolt attached to said upper end of said shell and to said piston for movement therewith; whereby when said pistons are moved to said lifting position, said jacking bolts engage an upper surface of said upper end of said shell to separate said dome from contact with said screen assembly and said upper end and when said piston is moved to said sealing position, said jacking bolts contact a lower surface of said upper end to draw said lower end of said dome into sealed contact with said screen assembly and said upper end of said tank.

4. The arrangement of claim 3 wherein said jacking bolts are associated with said upper end with a lost motion attachment.

5. The arrangement of claim 3 wherein said pistons are provided with a threaded cavity extending vertically from a lower surface thereof, said jacking bolts are united with said pistons when threaded into said cavities.

6. The vacuum removal system of claim 3 wherein said dome is provided about its outer periphery with a plurality of equally spaced support lugs, a jack lever is secured to each of said support lugs for pivotal movement and means are provided to connect each of said jack lever with said pistons.

7. The arrangement of claim 6 wherein said connecting means comprise a link assembly pivotally mounted to each of said jack levers at a point off-set from the pivotal axis of said jack lever, said link assembly is also pivotally connected to an end of said piston;

bearing means carried by said support lugs receive said pistons for vertical movement between said sealing and lifting positions; whereby, when said jack levers are moved to a first position, said pistons move away from said upper end of said tank carrying the jacking bolts into engagement with said lower surface thereof to draw said dome and said shell toward each other; and when said jack levers are moved to a second position, said pistons are moved toward said upper end carrying said jacking bolt into engagement with said upper surface of said upper end to force said dome and said shell away from each other.

8. The arrangement of claim 6 wherein said upper end of said tank comprises a shoulder to which an adaptor plate is attached, a plurality of hanging lugs are equally spaced about the periphery of said adapter plate in alignment with said support lugs, said jacking bolts are each arranged to pass through spaced apertures in said hanging lugs.

9. The arrangement of claim 8 wherein each said hanging lugs are provided with a second aperture, a plurality of hanger rods extending from a ceiling support pass through said second aperture and means, arranged on a lower end of said hanger rods, engage a lower surface of said hanger lugs to maintain said vacuum cleaning tank suspended.

10. A vacuum cleaning arrangement having a collecting tank in which a jack system is arranged about the periphery of said tank which is operative to lift and separate an upper portion of said tank from a lower proton of said tank and also to move said upper and lower portions into contact under pressure;

an intake conduit connected to said lower portion and an outlet conduit connected to said upper portion;

a filter screen positioned between said upper and lower portions;

said filter screen comprising a screen formed of metal wires and a perforated metal plate;

a U-shaped resilient gasket secured about the outer surface of said filter screen; whereby, when said upper portion is drawn into contact with said lower portion, said portions engage said gasket with sufficient pressure to form an air-tight seal between said portions.

11. The arrangement of claim 10 wherein said screen comprises stainless steel wires woven together, the size said wires being between a number 20 and a number 200.

12. The arrangement of claim 10 wherein said metal plate is 3/16" steel.

13. The arrangement of claim 10 wherein said resilient gasket is neoprene.

14. The arrangement of claim 10 wherein the diameter of said filter screen is one of 24", 30", and 48".

15. A vacuum waste removal system in which a vacuum tank including an intake conduit and an outlet conduit is suspended from an overhead support by a plurality of hanger rods evenly arranged about its periphery;

jack means secured to said tank in positions adjacent each of said hanger rods;

said tank comprising a dome to which said outlet conduit is connected and a shell to which said intake conduit is connected;

a plurality of hanging plates extending radially from the exterior of said shell and means are provided to secure said hanger rods to said hanging plates to support said vacuum tank;

a plurality of supporting lugs extending radially from the exterior of said dome means and means for securing said jack means to said supporting lugs;

said jack means include linkage interconnecting said dome and said shell for positive movement between a separated position and an engaged position; and a filter screen assembly removably located between said dome and said shell; wherein, when said jack means positions said dome and said shell in said engaged position, the periphery of said filter screen is engaged therebetween to provide an air-tight seal and when said jack means positions said dome and said shell in said separated position, said periphery is released and the filter screen may be removed from said tank.

16. The arrangement of claim 15 wherein each of said hanger rods includes an upper and a lower rod untied with a coupling which acts to adjustably interconnect adjacent ends of said upper and lower support rods; and said securing means comprises an enlarged head at one end of said lower rod which engages with said hanging plate.

17. The arrangement of claim 15 wherein there are four hanger rods and four jack means arranged about said periphery at 90° intervals.

18. The arrangement of claim 16 wherein said jack means and said hanger rods are capable of maintaining said dome and said shell in said spaced relationship with one of said hanger rods and jack means disconnected and removed from one of said hanging plates so that said filter screen may be removed through an opening created by said removed hanger rod and jack means.

* * * * *